Patented May 26, 1925.

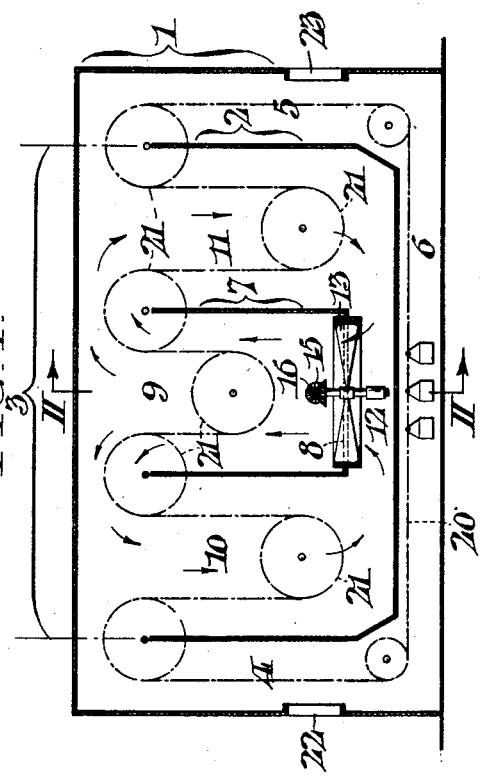

1,539,807

UNITED STATES PATENT OFFICE.

THOMAS ALLSOP AND WALTER W. SIBSON, OF PHILADELPHIA, PENNSYLVANIA, ASSIGNORS TO THE PHILADELPHIA DRYING MACHINERY COMPANY, OF GERMANTOWN, PENNSYLVANIA, A CORPORATION OF PENNSYLVANIA.

APPARATUS FOR DRYING OR OTHERWISE TREATING MANUFACTURES.

Application filed November 18, 1919, Serial No. 338,967. Renewed September 12, 1924.

*To all whom it may concern:*

Be it known that we, THOMAS ALLSOP and WALTER W. SIBSON, citizens of the United States, residing in Philadelphia, in the county of Philadelphia and State of Pennsylvania, have invented certain new and useful Improvements in Apparatus for Drying or Otherwise Treating Manufactures, whereof the following is a specification, reference being had to the accompanying drawings.

Our invention relates to apparatus for drying and other treatments, and is concerned with various phases of such operations, including the mode and conditions of application of the treating medium to the articles or products to be treated, and the presentation of the articles to the medium. We aim to provide for controlling and limiting the sphere of action of the treating medium, without interfering with the introduction and withdrawal of the material to be treated; to provide for circulation of the treating medium; and to provide for carrying on a plurality of treatments concurrently but separately, and more or less independently of one another. Also, the air which constitutes the treating medium may be physically modified in various ways, to produce correspondingly different results. The material to be treated may be slowly carried through the treating zone or zones by a conveyor.

In the drawings, Fig. I shows a longitudinal section (more or less diagrammatic) through an apparatus conveniently embodying our invention in one form.

Fig. II shows a cross section through the apparatus, taken as indicated by the line II—II in Fig. I.

Fig. III is a view similar to Fig. I, showing an apparatus with a plurality of separate treating compartments.

The apparatus shown in Figs. I and II comprises a quadrangular enclosure 1 and a partitioning structure or unit 2 of general U-shape therein, with sides and transverse members spaced from the corresponding enclosure walls, and with its ends also spaced from a corresponding wall. Thus the enclosure 1 is subdivided to afford a treating chamber or compartment 3 encompassed by the U-partition 2, with spaces or channels 4, 5 between the sides of the U and the corresponding (end) walls of the enclosure. The side walls of the U, especially, serve to exclude the action or circulation of the atmosphere in the chamber 3 from the spaces 4, 5, thus leaving them neutral in this respect. There is also a neutral space or channel 6 crosswise, between the transverse connective member or component of the U and the adjacent boundary of the enclosure 1, connecting the spaces 4, 5 and tending to equalize their temperatures and other conditions. Air flow or circulation in the chamber 3 may be produced by a rotary fan 13, shown adjacent the transverse member of the U, so that the latter cooperates with it to deflect and direct the air flow. This fan 13 may be driven by means of bevel gear connections 15 to a shaft 16 extending to the exterior of the enclosure 1, and provided with a driving pulley 17. A sprocket chain conveyor 20 carries the material to be treated through the chamber 3, in a circuitous course determined by a number of sprockets conventionally indicated at 21.

The chamber 3 is subdivided by partitioning 7 to afford separate inner spaces or chambers 9, 10, 11, one in line with the fan 13. As shown, the partitioning 7 is a U structure or unit arranged similarly to the U partition 2, and the fan 13 is mounted in a central opening in its transverse connective member or component. Thus the air is propelled by the fan 13 one way through the chamber 9, returning outside it through the lateral spaces 10, 11 and the space 12 between the transverse members of the U's. As shown, the conveyor 20 takes a sinuous or looping course through the enclosure 1,— doubling around the ends of the partitions 2 and 7, between them and the adjacent enclosure wall; making an up and down pass in each of the inner chambers or compartments 9, 10, 11; and reversing close in front of the fan 13. Thus the material to be treated is repeatedly exposed to the action of the air from every side, while the divided air circulation assures thorough distribution and dissipation. Though the air circulation is positively confined to the compartment 3, the conveyor 20 is diverted to pass through the spaces 4, 5, so as to be accessible for loading and unloading through the openings 22, 23 in the enclosure walls. After unloading at the opening 23, the conveyor (as here shown) descends in the channel 5 and returns to the channel 4 and the loading opening 22 through the channel or passage 6. In other words the conveyor passes through the interior of and around the outer partition structure 2.

Fig. III illustrates an adaptation of the construction hereinbefore described to the carrying on of a variety of separate treatments, by extension of the scheme of subdivision. While only two treating compartments are shown, it will be seen that on the principle illustrated, they can be duplicated indefinitely in a more extensive apparatus for effecting a greater number or variety of separate consecutive treatments.

As shown in Fig. III, partitioning structures 25, 25 corresponding to that marked 2 in Figs. I and II afford a like number of separate treating chambers or compartments 26, 27. Besides being spaced from the corresponding enclosure walls to afford spaces or channels 28, 29 corresponding to those marked 4, 5 in Fig. I, the structures 25, 25 are separated to afford a space or channel 30 between them, which is connected to each of the spaces 28, 29 by a space or channel 31 corresponding to the space or passage 6 in Figs. I and II. Besides passing through the compartments 26, 27 and being diverted into the end spaces 28, 29, and even traversing the channel 31, as before, the conveyor also passes through a space outside of either compartment 26, 27 on its way from one to the other, so as to avoid direct transfer of its charges from compartment to compartment: viz., as here shown, after leaving the compartment 26 the conveyor passes through the intermediate space 30 in a downward and upward loop before entering the compartment 27. Each of the treating chambers 26, 27 has U partitioning 33 corresponding to the U partitioning 7 in Fig. I, and forming separate inner spaces or chambers 34 and 35, 35, with a space 36 between the transverse members of the U 33 and that of the U 25, and a rotary fan 37 arranged for circulating the air as in Fig. I.

Thus, it will be seen that although the treating compartments 26, 27 open into a common space in the top of the enclosure, yet the circulation in each of them is completely isolated from that of the other, so that different atmospheric conditions can be maintained in them quite readily, without liability of virtual equalization between them. For example, the first, 25, may be provided with humidifying means such as shown at 38, for imparting a certain degree of moisture to the air as it passes the fan 37; and the second, 26, may be provided with radiators or coils 39, which may be used either for heating or for cooling the atmosphere. The passage of the conveyor through a space outside of either compartment on its way from one to the other, as already described, avoids direct transfer of its charges from one atmospheric condition to another, and allows sufficient lapse of time before one set of conditions is succeeded by another to obviate any harmful effects from the change. As before, the conveyor passes through the interiors of and around the partition structures 25, 25.

Claims.

1. Apparatus of the character described comprising an enclosure including a treating chamber encompassed by a U partition affording neutral spaces, substantially free from the action of the treating medium, between the sides of the U and the corresponding enclosure walls, the ends of the U being also spaced from a corresponding wall of the enclosure.

2. Apparatus of the character described comprising an enclosure; a U partition therein; and radiators within said partition.

3. Apparatus of the character described comprising an enclosure; a U partition therein; and means for creating a circulation of air substantially confined to the interior of said partition.

4. Apparatus of the character described comprising an enclosure including a treating chamber encompassed by a U partition, and a fan within said partition circulating the air therein to the exclusion of the space outside the partition.

5. Apparatus of the character described comprising an enclosure, a U partition therein, and means for circulating the air within said partition cooperating with the connective member of the U as a deflector for directing the flow.

6. Apparatus of the character described comprising an enclosure with a U partition therein; partition means forming an inner chamber within the U; and a rotary fan therein for producing a flow of air one way through the chamber, with return outside the same within said U partition.

7. Apparatus of the character described comprising an enclosure including a treating chamber encompassed by a U partition; a rotary fan therein for creating an air current; and means for conveying material to be treated through the drying chamber in a looping course, with reversal close in front of said fan.

8. Apparatus of the character described comprising an enclosure; a U partition therein, with its ends spaced from a corresponding enclosure wall; means for conveying articles to be treated passing between the ends of said partition and the adjacent enclosure wall, and through the space within the partition; and heating means in said space.

9. Apparatus of the character described comprising an enclosure; a U partition therein, with its ends spaced from a corresponding enclosure wall; means for conveying articles to be treated passing between the ends of said partition and the adjacent enclosure wall, and through the space within the partition; and means for creating a circulation of air substantially confined to said space.

10. Apparatus of the character described comprising an enclosure; U partitions therein, and radiators located within one of said partitions.

11. Treating apparatus of the character described comprising an enclosure with U partitions therein confining and controlling circulation of the treating medium to the exclusion of spaces between partition and enclosure walls.

12. Apparatus of the character described comprising an enclosure, U partitions therein, and means for conveying material to be treated through the spaces within and between said partitions.

13. Apparatus of the character described comprising an enclosure, U partitions therein, and means for conveying material to be treated passing between the U sides and the adjacent enclosure walls and through the spaces within and between the U's.

14. Apparatus of the character described comprising an enclosure, U partitions therein, and means for conveying material to be treated through the enclosure in a sinuous course doubling around the ends of the U's and also reversing in the spaces within and between them.

15. Treating apparatus of the character described comprising an enclosure with U partitions therein, one within another, confining and controlling the action of the treating medium to the exclusion of spaces outside the outer partition.

16. Apparatus of the character described comprising an enclosure with U partitions similarly arranged one within another therein.

17. Treating apparatus of the character described comprising an enclosure with U partitions therein, one within another, confining and controlling circulation of the treating medium, the outer partition being devoid of right angles in cross-sectional shape.

18. Apparatus of the character described comprising an enclosure; a U partition therein; partition means forming an inner chamber within the U; and means for conveying material to be treated through said inner chamber and the space between its wall and the U wall outside it.

19. Apparatus of the character described comprising an enclosure; a U partition therein; partition means forming an inner chamber within the U; and means for conveying material to be treated through said inner chamber passing between the U sides and the adjacent enclosure walls.

20. Apparatus of the character described comprising an enclosure; U partitions similarly arranged therein, one within another; and means for conveying material to be treated through the enclosure in a sinuous course doubling around the ends of the U's and also reversing in the spaces within and between them.

21. Apparatus of the character described comprising an enclosure, U partitions therein, and means for conveying material to be treated through the enclosure in a sinuous course doubling around the ends of the U's and also reversing in the spaces within and between them, and radiators within one of said partitions.

22. Apparatus of the character described comprising an enclosure; a U partition therein; partition means forming an inner chamber within the U; and means for producing circulation through said inner chamber and the space between its wall and the U wall.

23. Apparatus of the character described comprising an enclosure; U partitions therein, one within another, and a fan within one of the partitions for producing an air current.

24. Apparatus of the character described comprising an enclosure with U partitions therein, one within another, and a rotary fan in an opening in the connective member of the inner U.

25. Apparatus of the character described comprising an enclosure with upward open U partitions therein, one within another, and a rotary fan in an opening in the bottom member of the inner U.

26. Apparatus of the character described comprising an enclosure; U partitions therein, one within another, radiators located within one of the partitions; and a fan within one of the partitions for producing an air current.

27. Apparatus of the character described comprising an enclosure; U partitions therein, one within another; radiators within and between the partitions; and a fan within one of the partitions for producing an air current.

28. Apparatus of the character described comprising an enclosure; a U partition therein; partition means forming an inner chamber within the U; a rotary fan in said chamber; and means for conveying material to be treated through the enclosure in a sinuous course doubling around the ends of the partitions and reversing in said inner chamber close in front of said fan.

29. Apparatus of the character described comprising an enclosure; U partitions therein, one within another; radiators within the inner partition and between the partitions; and means for transporting material to be treated through the enclosure in a sinuous course doubling around the ends of the U's and passing through the space within the inner one.

30. Apparatus of the character described comprising an enclosure; U partitions therein; partition means forming an inner chamber within the U; means for conveying material to be treated passing between the ends of said U partition and an adjacent enclosure wall and through said inner chamber; and means for circulating the air within said U partition to the exclusion of spaces outside it.

31. Apparatus of the character described comprising an enclosure; U partitions therein, one within another; means for conveying material to be treated through the spaces within and between the partitions; means for creating an air flow within the partitions; and heating means.

32. Apparatus of the character described comprising an enclosure; U partitions therein, one within another; heating means within one of the partitions; means for conveying material to be treated through the spaces within and between the partitions; and a fan within one of the partitions for circulating the air.

33. Apparatus of the character described comprising an enclosure; U partitions similarly arranged one within another therein, with spaces beside the outer one accessible from the exterior of the enclosure; means for producing circulation in the inner U and between the U's; and means for conveying material to be treated through the enclosure in a course passing within the partitions and also through the aforesaid spaces.

34. Apparatus of the character described comprising an enclosure; upward open U partitions therein, one within another, with spaces beside the outer one accessible from the exterior of the enclosure; a rotary fan in an opening in the bottom member of the inner U for circulating air through the latter and the space between the U's; and means for conveying material to be treated through the enclosure in a course passing within the partitions and also through the aforesaid spaces.

35. Apparatus of the character described comprising an enclosure subdivided to afford a plurality of treating compartments; means for circulating the air independently in said compartments; and means for conveying material to be treated through said compartments.

36. Apparatus of the character described comprising an enclosure with partition means therein forming channels adjacent its bottom and ends and a plurality of treating compartments; independent means for circulating the air in the respective compartments, so that different treating conditions may be maintained in them; and means for conveying material to be treated through the said compartments and channels.

37. Apparatus of the character described comprising an enclosure with partition means therein forming channels adjacent its bottom and ends and a plurality of separate treating compartments opening into a common space in the top of the enclosure; means for maintaining independent air circulations in the compartments; and means for conveying material to be treated through the said compartments and passages.

38. Apparatus of the character described comprising an enclosure including treating compartments encompassed by U partition means; means for circulating the air independently in said compartments; and means for conveying material to be treated passing through the interior of and around said partition means.

39. Apparatus of the character described comprising an enclosure with partition means forming therein separate treating compartments; means for maintaining different treating conditions in different compartments; and means for conveying material to be treated through said compartments passing through a space outside them on the way from one to the other, so that the material is not transferred directly from one treating condition to another.

40. Apparatus of the character described comprising an enclosure and separated partitioning units therein affording a plurality of treating compartments with space between them, so that different treating conditions may be maintained in them; and means for conveying material to be treated through the compartments one after another, and also through the space between compartments, so that the material is not transferred directly from one compartment to another.

41. Apparatus of the character described comprising an enclosure subdivided by laterally adjacent U partitions to afford treating compartments separated from corresponding enclosure walls by spaces accessible from the exterior of the enclosure, with passage cross-wise of said spaces to connect them with the space between units and with one another; and means for conveying material to be treated through the enclosure traversing a course through said compartments and through the said passage and spaces.

In testimony whereof, we have hereunto signed our names at Philadelphia, Pennsylvania, this seventeenth day of November, 1919.

THOMAS ALLSOP.
WALTER W. SIBSON.

Witnesses:
JAMES H. BELL,
E. L. FULLERTON.